United States Patent
Bastion

[19]

[11] Patent Number: 6,006,640
[45] Date of Patent: Dec. 28, 1999

[54] BAGEL SLICER

[76] Inventor: Michael R. Bastion, RR 3 Box 242, Troy, Pa. 16947

[21] Appl. No.: 09/062,774

[22] Filed: Apr. 20, 1998

Related U.S. Application Data

[60] Provisional application No. 60/046,579, May 15, 1997.

[51] Int. Cl.$^6$ .................................................. B26D 3/30
[52] U.S. Cl. .............................. 83/454; 30/286; 99/537
[58] Field of Search .................. 83/870, 452, 454, 83/762, 932, 743, 745, 574, 875–878; 30/286, 289, 280, 294; 269/87.2; 99/537, 539, 543, 567

[56] References Cited

U.S. PATENT DOCUMENTS

| | | |
|---|---|---|
| D. 343,770 | 2/1994 | McFarling et al. . |
| 2,349,465 | 5/1944 | Rupin ........................................ 99/567 |
| 3,266,643 | 8/1966 | Prentice .................................... 99/537 |
| 3,338,282 | 8/1967 | Blum ........................................ 83/564 |
| 4,249,445 | 2/1981 | Browning ................................. 83/762 |
| 4,412,483 | 11/1983 | Hoegh ..................................... 99/537 |
| 4,629,629 | 12/1986 | David ....................................... 99/537 |
| 4,948,106 | 8/1990 | Popeil et al. ........................... 269/87.2 |
| 4,979,419 | 12/1990 | Sonkin ..................................... 99/567 |
| 5,361,666 | 11/1994 | Kensrue ................................... 83/870 |
| 5,481,953 | 1/1996 | McLeod .................................... 83/762 |
| 5,577,430 | 11/1996 | Gunderson et al. ..................... 83/870 |

FOREIGN PATENT DOCUMENTS

| | | |
|---|---|---|
| 735446 | 8/1955 | United Kingdom . |
| 1468248 | 3/1977 | United Kingdom . |
| 2172494 | 9/1986 | United Kingdom . |

OTHER PUBLICATIONS

Gifts & Decorative Accessories, Oct., 1984, p. 122.

*Primary Examiner*—Kenneth E. Peterson
*Assistant Examiner*—Gyounghyon Bae
*Attorney, Agent, or Firm*—Richard C. Litman

[57] ABSTRACT

A bagel slicer which comprises a drive disk, a drive shaft, an enclosure disk and a retaining apparatus. The drive disk has a concave inside face for receiving one side of a bagel. The drive disk also has a through hole for receiving a drive shaft. The enclosure disk has a concave inside face for receiving the other side of a bagel. The enclosure disk also has a through hole in which the drive shaft is inserted. The drive disk, drive shaft and enclosure disk are held into position by the retaining apparatus. This is accomplished by interlocking fasteners located on the drive shaft and the retaining apparatus.

6 Claims, 3 Drawing Sheets

BAGEL SLICER

CROSS-REFERENCE TO RELATED APPLICATION

This application claims the benefit of U.S. Provisional patent application Ser. No. 60/046,579, filed May 15, 1997.

BACKGROUND OF THE INVENTION

1. Field of the Invention

The present invention relates to an apparatus for cutting food, and more precisely an apparatus for cutting toroidal shaped food, such as a bagel.

2. Description of Related Art

A bagel is generally circular in shape, its circular diameter defining its width, and is rounded on its top and bottom surfaces, the distance between these surfaces defining its height or thickness. Also, a bagel has a hole through its center, passing through the bagel along the axis of thickness. Prior to eating a bagel, one usually cuts it in half through a plane transverse to the axis of thickness, in order to sandwich other foodstuff, such as cream cheese, within the resulting cut faces of the bagel.

Cutting a bagel in half, though, poses a risk of accidently cutting one's hands or fingers due to its rounded shape. Consequently, various food cutting devices specifically adaptable to cutting a bagel are known in the prior art. Simple devices include generally rectangularly shaped boxes having a cavity for inserting a bagel and opposing knife slots for guiding a knife during the cutting action. For example, U.S. Pat. No. 4,948,106 issued Aug. 14, 1990 to Ronald Popeil and Alan Backus shows a food cutting apparatus which is an open ended, generally trapezoidal box with opposing slots to guide a knife. While this apparatus accomplishes its object of cutting food, the food is not secure and may slip or turn during the cutting motion.

Other devices similar to the above invention in their basic functional design include U.S. Pat. No. Des. 343,770 issued Feb. 1, 1994 to Jay A. McFarling and Jennie E. McFarling. An oak bagel cutter for sale in the Gifts & Decorative Accessories catalog, October 1984, p. 122, improves upon such design by including a slidable rod for abutting against the side of a bagel, thereby holding it in place. U.S. Pat. No. 5,481,953 issued Jan. 9, 1996 to John A. McLeod also describes an apparatus with a base and two vertically attached and opposing sides, but one side is moveable to adjust to a bagel's thickness. Another similar device is shown in U.S. Pat. No. 4,249,445 issued Feb. 10, 1981 to Richard J. Browning, the device having one vertical side and leaning, pivotal second side for holding the bagel.

A more complex apparatus is shown in U.S. Pat. No. 5,577,430 issued Nov. 26, 1996 to Glenn K. Gunderson and William K. Gunderson. The apparatus has a rotatable indexing disc which may be moved to various positions corresponding to the desired thickness of the slice. The problem with this arrangement is that only one side of a food product is supported by the apparatus. Thus, movement of a bagel while being sliced is highly likely.

Another complex device is shown in U.S. Pat. No. 3,338,282 issued Aug. 29, 1967 to Paul P. Blum. The '282 patent shows a bagel slicer with a pair of opposing mounted adjustable disks for holding the bagel in place, which discs are mounted on a rotatable spindle supported by a pair of struts depending upwardly from a base. The Blum device also comprises a pivotal knife attached to the bagel slicer which is brought into contact with a bagel fixed on and rotated on the spindle. A problem with this arrangement is that the knife has to be specifically designed for use with the Blum device; thus, if the user wanted to replace the knife, a special effort must be made to locate a replacement. Another problem with this arrangement concerns safety. Since the knife is attached to the bagel slicer, the blade is left out in the open when not in use, posing a danger of being cut.

An elaborate device with a spring loaded plate for retaining a bagel is shown in U.S. Pat. No. 5,361,666 issued Nov. 8, 1994 to Milo M. Kensrue. The plate applies pressure to one end of the bagel, while the other end is supported by an adjustable fixed plate. The problem with this apparatus is the complexity of its moving parts which could wear with multiple use.

Food cutting devices have also been described in foreign patents or applications. The following are samples of less relevant food cutting inventions found in foreign patents or applications: U.K. Patent Specification No. 735,446 published Aug. 24, 1955 (A New or Improved Cutting Board for Domestic Use); U.K Patent Specification No. 1,468,248 published Mar. 23, 1977 (Cutting Device for Foodstuffs); and, U.K. Patent Application No. 2,172,494A published Sep. 24, 1986 (Bread Slicing Guide).

None of the above patents or publications disclose an invention which holds toroidal shaped food between two easily connected disk shaped members, while allowing for rotation around the bagel's height axis while the bagel is being cut using a standard knife. None of the above inventions and patents, taken either singly or in combination, is seen to describe the instant invention as claimed.

SUMMARY OF THE INVENTION

The present invention is an apparatus for safely cutting food, particularly a toroidal shaped food such as a bagel. The invention comprises separate components which, when assembled, form a safe and effective apparatus for cutting food. First, there is a drive disk, having an inside face and an outside face. The inside face defines a concave cavity for receiving about one half of a bagel. Second, there is an enclosure disk with an inside face and an outside face. The inside face of the enclosure disk also defines a concave cavity for receiving the opposite half of the bagel. Thus, when the parts of the invention are assembled, the inside faces of the drive disk and the enclosure disk oppose each other, forming a gap therebetween for passage of a knife, and trapping the bagel within the cavities.

Both the drive disk and enclosure disk have a through hole running from the respective disks' outside face to the inside face. These holes allow for the passage of the third major component of the invention, which is a drive shaft. The drive shaft fixedly positions the drive disk and enclosure disk so that the inside faces of the two disks oppose one another. The drive shaft is generally cylindrical in shape with a front end and a rear end. The drive shaft has an extended rear end serving as a handle, a fastener on the front end, and a dowel located near the handle and extending substantially perpendicular from the drive shaft. The dowel fits snugly into a recess in the drive disk. The dowel permanently mounts the drive disk to the drive shaft so that when the drive shaft is rotated about its axis, the drive disk rotates concurrently with the drive shaft.

In order for the drive shaft to fixedly position the drive disk and enclosure disk so that the inside faces of the two disks oppose one another, the fastener on the end of the drive shaft attaches to another fastener located on or outside of the outside face of the enclosure disk. In the preferred embodiment, the reciprocal fastener is located within a retainer knob. When the fasteners on the front end of the drive shaft and retainer knob interlock with one another, the retainer knob acts as a barrier for the enclosure disk, thereby preventing the enclosure disk from sliding off the front end of the drive shaft.

In use, the person places the hole of the bagel at the tip of the drive shaft and then pushes the bagel along the drive shaft until it is flush with the inside face of the drive disk. Following that, the person slips the enclosure disk onto the drive shaft so that the inside face of the enclosure disk contacts the opposite end of the bagel. Finally, the person locks the invention and bagel in place by using the retainer knob.

Once firmly in place, the bagel can be safely cut in half. The edges of the inside faces of the drive disk and enclosure disk form a gap which can be used to guide the knife to cut the bagel about its circumference. The person uses a knife in a sawing or ratcheting wrist action, and rotates the invention, such as by rolling it over a surface, until the bagel is cut in half. To remove the cut bagel, the person disassembles the invention by disengaging the retainer and removing the enclosure disk. The person can then remove the newly sliced bagel, toast it, put on the topping of his choice and enjoy.

Accordingly, it is a principal object of the invention to provide an adjustable food cutting apparatus which safely cuts food, such as a bagel, in half.

It is another object of the invention to provide an adjustable food cutting apparatus which is easy to operate and simple to manufacture.

It is a further object of the invention to provide an adjustable food cutting apparatus which keeps the food to be cut secure for effective cutting.

Still another object of the invention is to provide an adjustable food cutting apparatus which allows the user to rotatably adjust the apparatus to the desired area of cutting.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
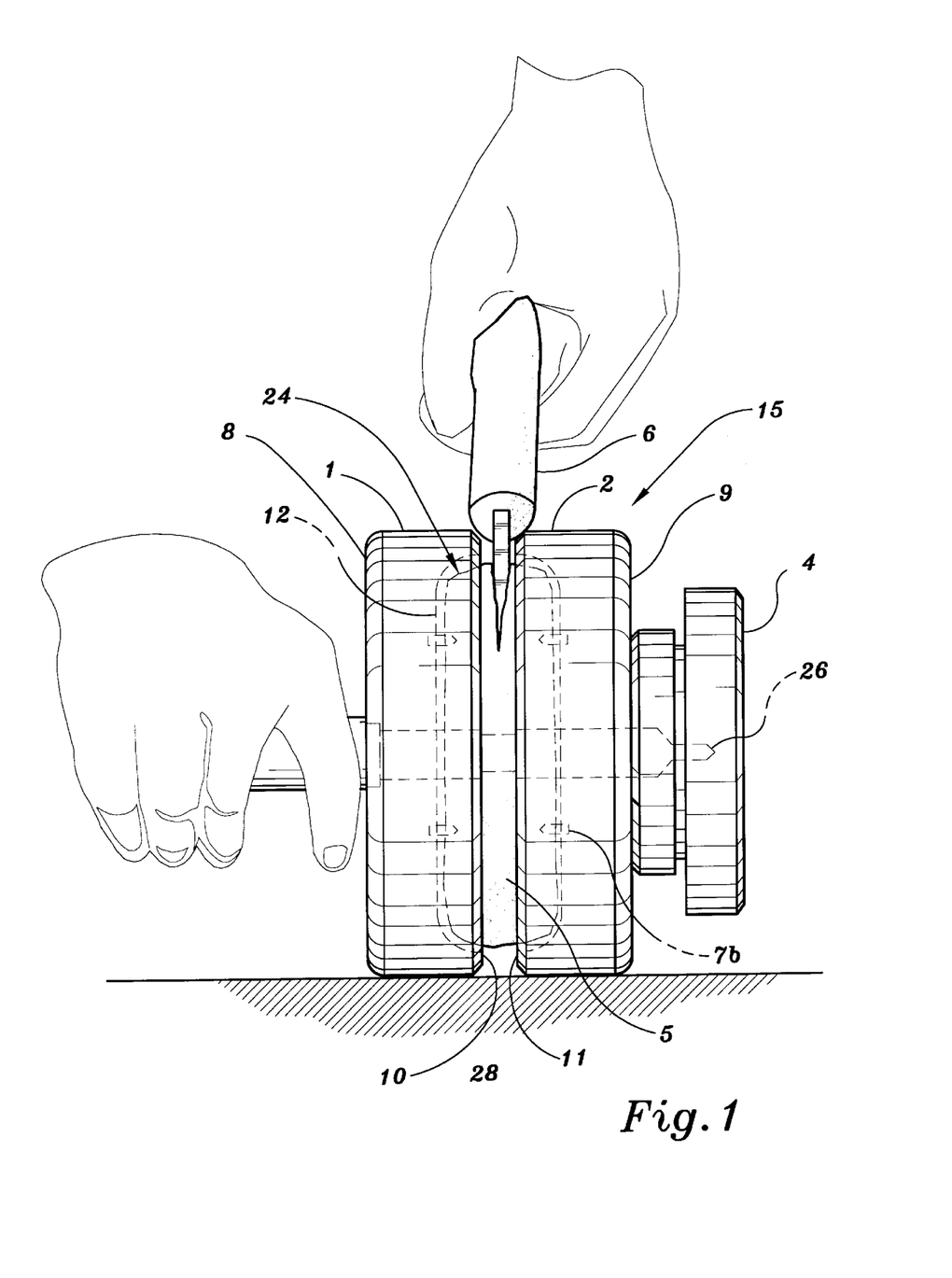
FIG. 1 is an environmental elevational view representing the invention in use with a person cutting a bagel with a knife.
Figure 2:
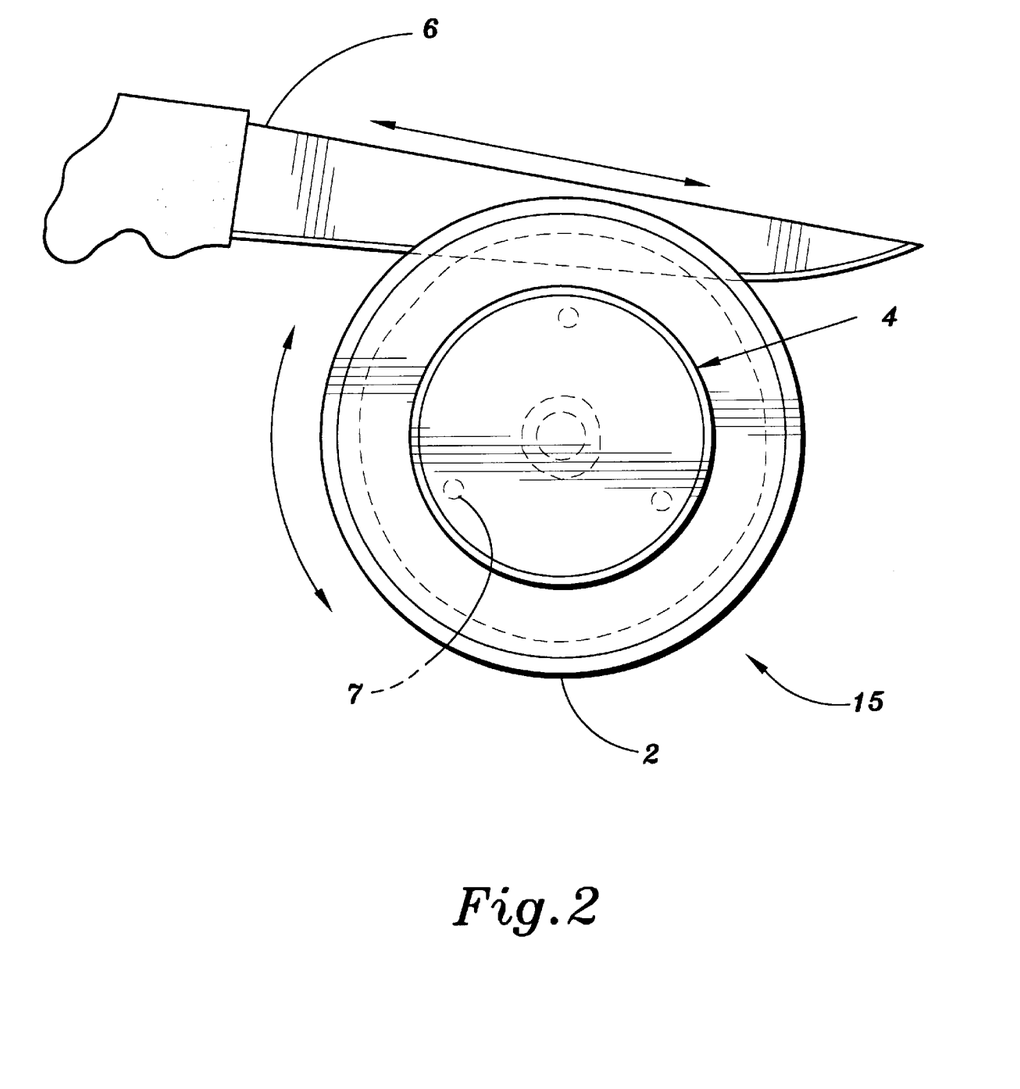
FIG. 2 is a partial environmental front view representing a bagel being cut in half and representing the back and forth cutting motion of the knife and rotation of the invention.
Figure 3:
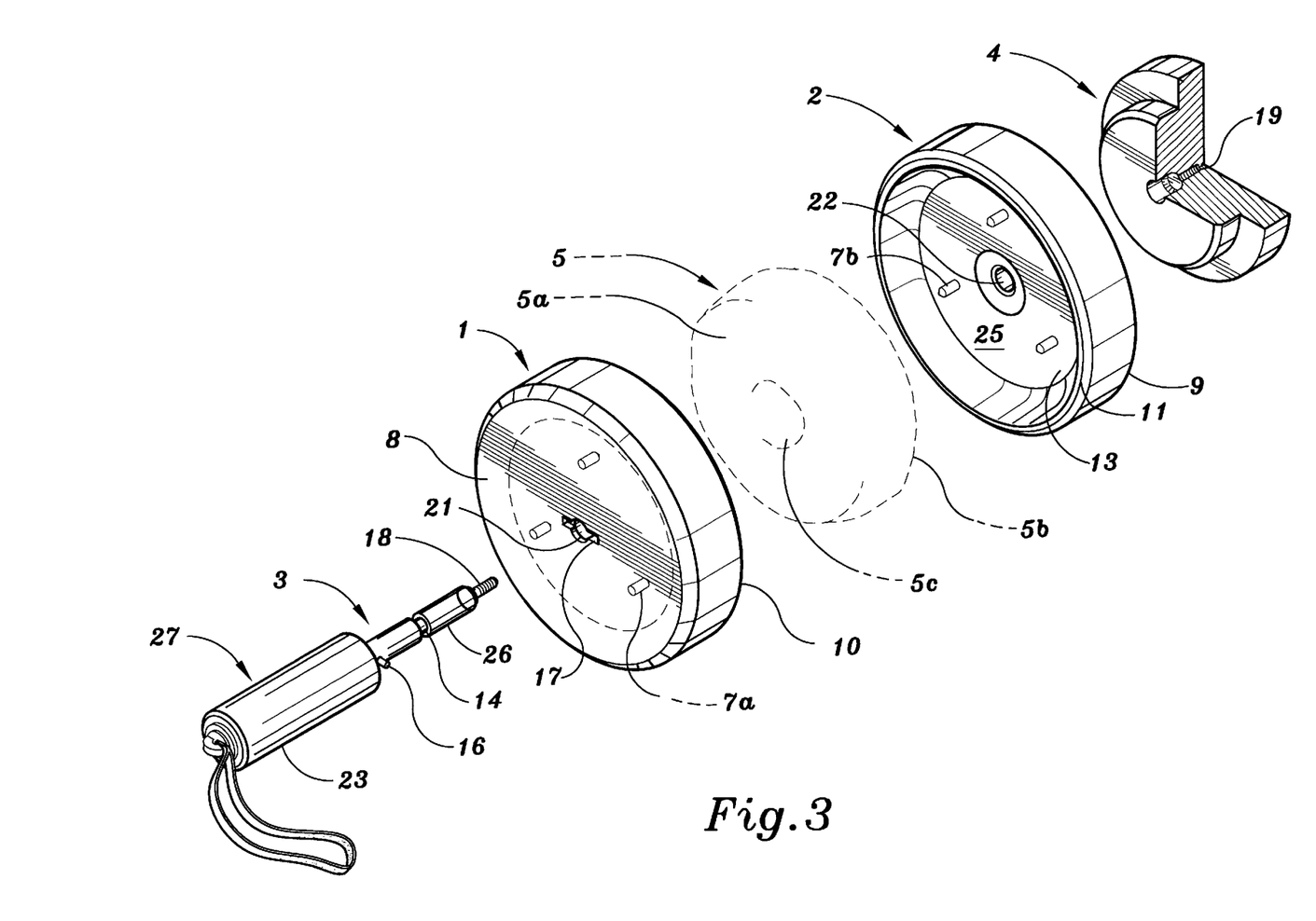
FIG. 3 is an exploded perspective view of the present invention.

The present invention relates to an apparatus for cutting food. For purposes of illustration, the food represented in FIGS. 1–3 is a bagel 5.

The preferred embodiment of the bagel slicer 15 has four major parts, which, when assembled, form a safe and effective tool for cutting a bagel 5. The four major parts comprise a drive disk 1, an enclosure disk 2, a drive shaft 3, and a retainer knob 4. FIGS. 1–2 represent the bagel slicer 15 in its use mode.

The drive disk 1 is preferably circular in shape, although it could be any shape nearing round, such as alternatively an octagon. The drive disk 1 has an inside face 12 and an outside face 8. The inside face 12 of the drive disk 1 defines a concave cavity 24 relative to the plane defined by the inside edge 10 of the drive disk 1. From the inside edge 10 of the drive disk 1, the inside face 12 curves inward towards the outside face 8. At a certain point within the drive disk 1, the inside face 12 is substantially flat and parallel to the plane defined by the outside face 8. The inside face 12 is thus shaped in order to conform to the shape of one side of a bagel 5a.

The planar portion of the inside face 12 has a plurality of anti-spin pins 7a protruding into the cavity 24. During use, the anti-spin pins 7a are forced into the bagel 5 to prevent the bagel 5 from unwanted rotation within the cavity 24 which would otherwise make the bagel 5 somewhat awkward to cut.

The enclosure disk 2 is circular in shape, although like the drive disk 1, the enclosure disk 2 can be of any shape suitable for the intended purposes described herein. The enclosure disk 2 has an inside face 13 and an outside face 9. The inside face 13 of the enclosure disk 2 defines a concave cavity 25 relative to the plane defined by the inside edge 11 of the enclosure disk 2. From the inside edge 11 of the enclosure disk 2, the inside face 13 curves inward towards the outside face 9. At a certain point within the enclosure disk 2, the inside face 13 is substantially flat and parallel to the plane defined by the outside face 9. The inside face 13 is thus shaped in order to conform to the shape of other side of a bagel 5b.

The planar portion of the inside face 13 has a plurality of anti-spin pins 7b protruding into the cavity 25. During use, the anti-spin pins 7b are forced into the bagel 5 to prevent the bagel 5 from unwanted rotation within the cavity 25 which would otherwise make the bagel 5 somewhat awkward to cut, and to cause the enclosure disk 2 to rotate in unison with the drive disk 1 and drive shaft 3 in order to prevent the retainer knob 4 from loosening.

The drive disk 1 has a concentric hole 21 passing from the outside face 8 to the inside face 12. Likewise, the enclosure disk 2 has a concentric hole 22 running from the outside face 9 to the inside face 13. The holes 21 and 22 allows a drive shaft 3 to pass through the disks 1 and 2.

In the use mode, the drive shaft 3 adjustably positions the drive disk 1 and enclosure disk 2 along the shaft 3 so that the disks 1,2 oppose each other with their inside faces 12 and 13 in a substantially parallel orientation. The distance between the inside edges 10 and 11 of the drive disk 1 and enclosure disk 2 is governed by the thickness of the bagel 5. The distance between the inside edges 10 and 11 also forms a gap 28 in which the knife 6 can pass in order to cut the bagel 5.

The drive shaft 3 is generally cylindrical in shape with a front end 26 and a rear end 27. The front end 26 is inserted into the hole 21 of the drive disk 1, passing from the outside face 8 to the inside face 12. The front end 26 is also inserted into the hole 22 of the enclosure disk 2, passing from the inside face 13 to the outside face 9. By inserting the drive shaft 3 into the two disks 1 and 2 in the above order, the inside faces 12 and 13 oppose each other.

Another purpose of the drive shaft 3 is to serve as an axle which rotates in conjunction with the drive disk 1. This is accomplished by locking the drive shaft 3 into the drive disk 1. The drive shaft 3 has a dowel 16 crossing perpendicular to it, near the rear end 27. As the drive disk 1 slides along the drive shaft 3, the outside face 8 comes into contact with the dowel 16. The drive disk 1 has a recess 17 which snugly accepts the dowel 16. Therefore, as one turns the drive shaft 3 upon its axis, the drive disk 1 is forced to turn in conjunction with the drive shaft 3.

The rear end 27 of the drive shaft 3 has a handle 23. This handle 23 is held by the user when cutting a bagel 5 in order to stabilize the bagel slicer 15 during the cutting action. In the use mode, the handle 23 is located outside of the outside face 8 of the drive disk 1.

The front end 27 of the drive shaft 3 has a first fastener 18 for keeping the bagel slicer 15 intact during the use mode. In the preferred embodiment, the first fastener 18 is a male threaded screw. The first fastener 18 attaches to a mating second fastener. In the preferred embodiment, the second fastener is a female threaded receiving pocket embedded 19 in a retainer knob 4. The retainer knob 4 is a separate piece which becomes flush with the outside face 9 of the enclosure disk 2 when the fasteners 18 and 19 are completely engaged. The retainer knob 4 is large enough to comfortably fit into the palm of the hand, being an enlarged circular member, which thereby permits easy grasping by the fingers and turning for assembly or disassembly.

The drive shaft 3 also has an annular knife recess 14. When the bagel slicer 15 is in use, the knife recess 14 is positioned inside the hole of the bagel 5*c*. The knife recess 14 serves as a relief for the knife 6, allowing the blade to pass sufficiently beyond the edge of the hole to cleanly cut the bagel; however, the drive shaft 3 obviously prevents the knife 6 from passing through the center of the bagel 5*c*.

In use, a user guides a knife 6 between the gap 28 defined by the inside edges 10 and 11 of the drive disk 1 and the enclosure disk 2. The user places the knife 6 on the bagel 5 and begins cutting the bagel 5 by moving the knife 6 back and forth. As the knife 6 gets to the center of the bagel 5*c*, it encounters the knife recess 14 on the drive shaft 3. The user simply rotates the bagel slicer 15 about the axis defined by the drive shaft 3 in order to access the remaining uncut portions of the bagel 5. The user continues rotating and cutting until the bagel 5 is completely cut.

It is to be understood that the present invention is not limited to the sole embodiment described above, but encompasses any and all embodiments within the scope of the following claims.

I claim:

1. A bagel slicer for use in slicing a toroidal shaped food, comprising:
    a) a drive disk having a first inside face and a first outside face, said first inside face being concave for receiving one side of a toroidal shaped food, said drive disk having a first through hole defined therein passing through the first outside face and the first inside face, said drive disk further including a plurality of anti-spin spins protruding from the first inside face of said drive disk;
    b) an enclosure disk having a second inside face and a second outside face, said second inside face being disposed opposite said first inside face and concave for receiving the opposite side of the toroidal shaped food, said enclosure disk having a second through hole defined therein passing through the second outside face and the second inside face, said enclosure disk further including a plurality of anti-spin pins protruding from the second inside face of said enclosure disk;
    c) a drive shaft having a front end and a rear end, said drive shaft inserted into said first through hole and said second through hole;
    d) a locking means for engaging said drive shaft to said drive disk; and
    e) a retaining means for joining said drive disk, said drive shaft and said enclosure disk.

2. The bagel slicer as recited in claim 1, wherein said drive shaft has a knife recess defined around the circumference of said drive shaft.

3. The bagel slicer as recited in claim 2, wherein said locking means comprises:
    a) a dowel disposed perpendicular to said drive shaft; and
    b) wherein the outside face of said drive disk has a recessed area for matingly receiving said dowel.

4. The bagel slicer as recited in claim 3, wherein said retaining means comprises:
    a) a retainer knob;
    b) a fastener attached to said retainer knob; and
    c) a mating fastener attached to said drive shaft.

5. The bagel slicer as recited in claim 4, wherein said fastener attached to said retainer knob is a female threaded receiving member.

6. The bagel slicer as recited in claim 5, wherein said mating fastener attached to said drive shaft is a male threaded screw.

* * * * *

UNITED STATES PATENT AND TRADEMARK OFFICE
CERTIFICATE OF CORRECTION

PATENT NO. : 6,006,640
DATED : December 28, 1999
INVENTOR(S) : Michael R. Bastion It is certified that error appears in the above-identified patent and that said Letters Patent is hereby corrected as shown below:

The title page should be deleted to appear as per attached title page.

Sheet 1, Fig. 1, delete drawing and substitute attached Fig. 1.
Sheet 3, Fig. 3, delete drawing and substitute attached Fig. 3.

Column 5, line 14, change reference numeral "27" to read --26--.
    Line 19, after "pocket", insert --19--;
    Line 19, after "embedded", delete "19".

Signed and Sealed this

Thirteenth Day of February, 2001

Attest:

NICHOLAS P. GODICI

Attesting Officer    Acting Director of the United States Patent and Trademark Office

United States Patent [19]

Bastion

[11] Patent Number: 6,006,640
[45] Date of Patent: Dec. 28, 1999

[54] BAGEL SLICER

[76] Inventor: Michael R. Bastion, RR 3 Box 242, Troy, Pa. 16947

[21] Appl. No.: 09/062,774

[22] Filed: Apr. 20, 1998

Related U.S. Application Data

[60] Provisional application No. 60/046,579, May 15, 1997.

[51] Int. Cl.$^6$ .................................................. B26D 3/30
[52] U.S. Cl. ............................... 83/454; 30/286; 99/537
[58] Field of Search .......................... 83/870, 452, 454, 83/762, 932, 743, 745, 574, 875–878; 30/286, 289, 280, 294; 269/87.2; 99/537, 539, 543, 567

[56] References Cited

U.S. PATENT DOCUMENTS

| D. 343,770 | 2/1994 | McFarling et al. | |
| 2,349,465 | 5/1944 | Rupin | 99/567 |
| 3,266,643 | 8/1966 | Prentice | 99/537 |
| 3,338,282 | 8/1967 | Blum | 83/564 |
| 4,249,445 | 2/1981 | Browning | 83/762 |
| 4,412,483 | 11/1983 | Hoegh | 99/537 |
| 4,629,629 | 12/1986 | David | 99/537 |
| 4,948,106 | 8/1990 | Popeil et al. | 269/87.2 |
| 4,979,419 | 12/1990 | Sonkin | 99/567 |
| 5,361,666 | 11/1994 | Kensrue | 83/870 |
| 5,481,953 | 1/1996 | McLeod | 83/762 |
| 5,577,430 | 11/1996 | Gunderson et al. | 83/870 |

FOREIGN PATENT DOCUMENTS

| 735446 | 8/1955 | United Kingdom . |
| 1468248 | 3/1977 | United Kingdom . |
| 2172494 | 9/1986 | United Kingdom . |

OTHER PUBLICATIONS

Gifts & Decorative Accessories, Oct., 1984, p. 122.

Primary Examiner—Kenneth E. Peterson
Assistant Examiner—Gyounghyon Bae
Attorney, Agent, or Firm—Richard C. Litman

[57] ABSTRACT

A bagel slicer which comprises a drive disk, a drive shaft, an enclosure disk and a retaining apparatus. The drive disk has a concave inside face for receiving one side of a bagel. The drive disk also has a through hole for receiving a drive shaft. The enclosure disk has a concave inside face for receiving the other side of a bagel. The enclosure disk also has a through hole in which the drive shaft is inserted. The drive disk, drive shaft and enclosure disk are held into position by the retaining apparatus. This is accomplished by interlocking fasteners located on the drive shaft and the retaining apparatus.

6 Claims, 3 Drawing Sheets

Fig.1

Fig.3